April 17, 1951     S. E. GUEST     2,549,459
LINCH PIN
Filed June 20, 1949
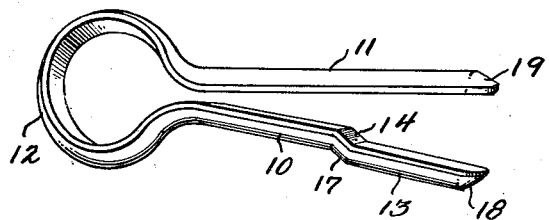
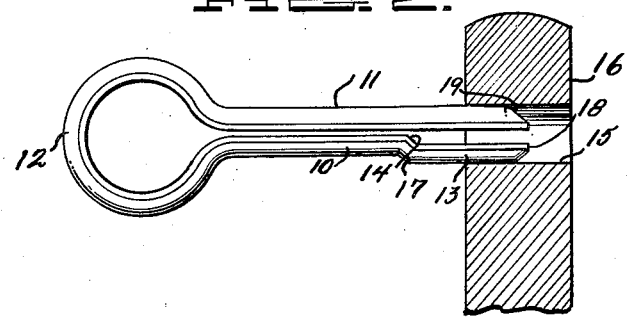
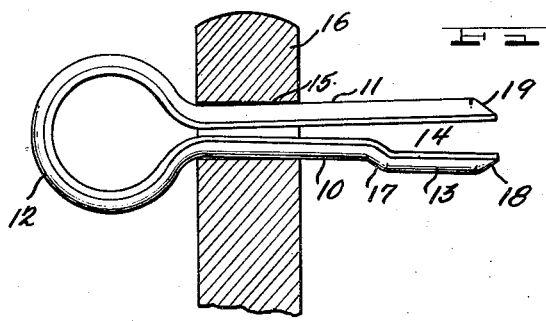
INVENTOR
SEALS E. GUEST
BY Adams & Bush
ATTORNEYS Patented Apr. 17, 1951

2,549,459

UNITED STATES PATENT OFFICE 2,549,459

LINCHPIN

Seals E. Guest, Marietta, Ga.

Application June 20, 1949, Serial No. 100,201

1 Claim. (Cl. 85—8.5)

This invention relates to linchpins and has more particular reference to linchpins of the bifurcated type.

One object of the present invention is to provide a novel and improved bifurcated linchpin which is self-locking after having been inserted in the receiving hole or bore in an axle or the like.

Another object of the present invention is to provide a linchpin, as above characterized, having the ends of its legs constructed to facilitate the insertion of the linchpin in the receiving hole or bore.

Another object of the invention is to provide a linchpin, as above characterized, which readily may be inserted in and withdrawn from the hole or bore in which it is adapted to be received, without the use of tools.

Another object of the invention is to provide a linchpin, as above characterized, the legs of which will be substantially free from compression after they have been completely inserted through the hole or bore in which they are adapted to be received.

A further object of the invention is to produce a simple and inexpensive linchpin which is rugged in construction and exceedingly effective for the purpose for which it is designed.

Other objects and advantages of the invention will appear in the following specification when considered with the accompanying drawing, wherein:

Fig. 1 is a perspective view of a linchpin constructed in accordance with the present invention;

Fig. 2 is a section through an axle or rod showing the linchpin of Fig. 1 in the process of insertion through a bore therein; and Fig. 3 is a view similar to that of Fig. 2, but showing the linchpin fully inserted in the axle or rod.

Referring now to the drawing, there is shown in Fig. 1, a preferred embodiment of a linchpin made in accordance with the present invention and comprising two diverging legs 10, 11 connected by a rounded end or eye 12, which acts as a spring connection between the two legs 10, 11. Preferably, and as shown, the linchpin is made of half round metal bar stock of the desired diameter, bent to the shape shown. The legs 10, 11 are rigid except for the resiliency provided by the rounded end or eye 12 which connects them.

The free end portion 13 of the leg 10 is offset outwardly, as indicated at 14. The offset portion 13 extends in a plane substantially parallel to the plane of the remaining portion of the leg, as shown in Fig. 1. The amount of the offset is such that when the two legs are forced substantially together in substantially parallel relation to permit the linchpin to be inserted in the hole or bore 15 in the axle or rod 16, as shown in Fig. 1, the circumference of the combined legs through the offset portion will be slightly less than the internal diameter of the bore 15.

Preferably, and as shown, the length of the legs of the linchpin relative to the length of the bore is such that when the legs of the linchpin have been inserted through the bore, the lower end portions of the legs, including the offset portion, will project below the bottom edge of the bore, as shown in Fig. 3. Also, the divergence of the legs is such that when the legs of the linchpin have been inserted through the bore, as shown in Fig. 3, the upper portion of the legs within the bore will not be compressed, leaving the linchpin free from any stress that would be caused by such compression. In this position, the divergence of the portions of the legs immediately below the bottom edge of the bore tends to prevent any upward movement of the linchpin in the bore, as such upward movement would require the legs to be pressed toward each other. This resistance of the two legs to being pressed together increases as the linchpin is moved upwardly through the bore and reaches its maximum when the beveled shoulder 17 of the offset portion engages the bottom edge of the bore and the offset portion 13 of the leg 10 is forced into substantially parallel relation to the opposing portion of the leg 11, as shown in Fig. 2. In this connection, it is pointed out that this maximum force required to force the offset portion back into the bore is greater than any usual force that would be encountered during any normal operation of apparatus with which the linchpin is employed. However, this force is not too great to prevent the linchpin from being pulled out of the bore without the use of tools, thereby permitting an operator to insert and remove the linch pin manually without the use of tools.

The ends of the legs 10, 11 are tapered, as indicated at 18 and 19, respectively. This construction facilitates the insertion of the linchpin in the bore, as the tapered ends of the legs have a frusto conical shape.

From the foregoing, it readily will be seen that there has been provided a novel and improved bifurcated linchpin which is readily inserted in and removed from a bore in an axle or the like, without the use of tools, and which, after insertion, is locked in place by means of an offset formed on the projecting end portion of one of the legs.

Having thus described the invention, what is claimed is:

A linchpin of the push-in type made of half-round metal bar throughout, bent upon itself and forming a pair of rigid legs of substantially the same length and resiliently connected by a large eye; said legs normally extending in diverging relation from said eye with their flat surfaces presented toward each other; one of said legs consisting of two straight parallel portions and an outwardly offset connecting portion, with the offset portion providing a cam shoulder on the outer surface of the leg facing said eye; the other of said legs being straight throughout, the divergency of said legs and the resiliency of said eye being such as to permit an operator to press the legs into substantial parallelism without the use of tools and the amount of the offset of said offset portion being such that, when the legs are brought into substantial parallelism, the widest dimension across the combined legs is slightly less than the diameter of the bore through which the legs are adapted to be inserted, the tips of said legs being bevelled to facilitate their insertion into a bore, and the construction being such that the legs will not be deformed during their insertion.

SEALS E. GUEST.

REFERENCES CITED

The following references are of record in the file of this patent:

UNITED STATES PATENTS

| Number | Name | Date |
|---|---|---|
| 329,861 | Stark | Nov. 3, 1885 |
| 362,548 | Smith | May 10, 1887 |
| 417,772 | Deering | Dec. 24, 1889 |
| 889,195 | Bowman | June 2, 1908 |
| 1,160,807 | Wymer | Nov. 16, 1915 |
| 1,244,076 | Pfister | Oct. 23, 1917 |
| 1,427,696 | Permento | Aug. 29, 1922 |
| 1,429,353 | Karsky | Sept. 19, 1922 |
| 2,401,976 | Simpson | June 11, 1946 |